(12) United States Patent
Backes et al.

(10) Patent No.: US 10,088,126 B2
(45) Date of Patent: Oct. 2, 2018

(54) SYMBOL DISPLAY ELEMENT FOR A VEHICLE INTERIOR

(75) Inventors: Ulrich Backes, Radolfzell (DE); Harald Koehnlein, Gottmadingen (DE)

(73) Assignee: TRW Automotive Electronics & Components GmbH (DE)

( * ) Notice: Subject to any disclaimer, the term of this patent is extended or adjusted under 35 U.S.C. 154(b) by 73 days.

(21) Appl. No.: 13/806,169

(22) PCT Filed: Jun. 8, 2011

(86) PCT No.: PCT/EP2011/002822
§ 371 (c)(1),
(2), (4) Date: Aug. 12, 2015

(87) PCT Pub. No.: WO2011/160776
PCT Pub. Date: Dec. 29, 2011

(65) Prior Publication Data
US 2015/0343946 A1    Dec. 3, 2015

(30) Foreign Application Priority Data

Jun. 23, 2010  (DE) .................. 10 2010 024 700

(51) Int. Cl.
*G09F 13/00* (2006.01)
*G09F 13/08* (2006.01)
(Continued)

(52) U.S. Cl.
CPC ............. *F21V 13/02* (2013.01); *B60K 35/00* (2013.01); *B60Q 3/14* (2017.02); *G09F 9/405* (2013.01);
(Continued)

(58) Field of Classification Search
CPC ......... B60Q 3/044; G09F 13/06; G09F 9/302; G09F 7/02; G09F 7/165;
(Continued)

(56) References Cited

U.S. PATENT DOCUMENTS 3,244,071 A   4/1966   Gumpertz
3,331,277 A   7/1967   Wehde
(Continued)

FOREIGN PATENT DOCUMENTS

DE          29511962        11/1995
DE         102004007802      9/2005
(Continued)

*Primary Examiner* — Karabi Guharay
(74) *Attorney, Agent, or Firm* — Tarolli, Sundheim, Covell & Tummino LLP

(57) ABSTRACT

A symbol display element for a vehicle interior is proposed, which comprises a front cover formed by a diffusing lens. A shadow mask is arranged in the optical path between the diffusing lens and a plurality of point light sources which can be activated separately, and includes for each point light source an associated symbol which is projected in an enlarged manner onto the rear side of the diffusing lens upon activation of the corresponding point light source. With this easily realizable configuration of the display element, the different symbols share a common display surface on the diffusing lens which acts as a rear projection screen.

10 Claims, 1 Drawing Sheet

(51) Int. Cl.
*F21V 13/02* (2006.01)
*B60K 35/00* (2006.01)
*G09F 9/40* (2006.01)
*G09F 13/22* (2006.01)
*B60Q 3/14* (2017.01)
*G09F 21/04* (2006.01)
*F21Y 115/10* (2016.01)

(52) U.S. Cl.
CPC .............. *G09F 13/08* (2013.01); *G09F 13/22* (2013.01); *B60K 2350/203* (2013.01); *B60K 2350/2052* (2013.01); *B60K 2350/2056* (2013.01); *F21Y 2115/10* (2016.08); *G09F 21/045* (2013.01)

(58) Field of Classification Search
CPC ....... G09F 2013/1854; G09F 2013/222; G09F 13/08; G09F 13/22

USPC ................................. 362/482, 488; 313/510
See application file for complete search history.

(56) References Cited

U.S. PATENT DOCUMENTS

| 4,448,504 | A | * | 5/1984 | Altman | .................... | G09F 9/405 |
| | | | | | | 353/102 |
| 2009/0323311 | A1 | * | 12/2009 | Mezouari | ............... | B60Q 3/044 |
| | | | | | | 362/97.1 |
| 2011/0061276 | A1 | * | 3/2011 | Boyles | ...................... | G09F 7/08 |
| | | | | | | 40/576 |

FOREIGN PATENT DOCUMENTS

| JP | 63 177891 | 11/1988 |
| JP | 8234673 | 9/1996 |
| JP | 2001236030 | 8/2001 |

\* cited by examiner

SYMBOL DISPLAY ELEMENT FOR A VEHICLE INTERIOR

RELATED APPLICATIONS

This application corresponds to PCT/EP2011, filed Jun. 8, 2011, which claims the benefit of German Application No. 10 2010 024 700.6, filed Jun. 23, 2010, the subject matter, of which are incorporated herein by reference in their entirety.

BACKGROUND OF THE INVENTION

The invention relates to a symbol display element for a vehicle interior.

In a typical vehicle interior, a plurality of illuminated symbol display elements are used to make information about operating states of components mounted in the vehicle optically perceptible for the vehicle occupants. Different operating states of a component can be displayed by means of appropriately different illuminated symbols which can be activated separately in a selective manner. The headlights of a vehicle can for example be switched between "dimmed" and "turned up", and the appropriate illuminated symbol is activated to show the driver the operating state in a clearly visible manner. However, different symbols cannot be displayed in exactly the same position if no display element is used that can be switched between different symbol representations. Switchable symbol display elements can be realized by means of LCD displays which are however very expensive.

There is a need not satisfied up to now for a symbol display element which can selectively display different symbols separately on the same display surface without having to use an expensive technique such as in LCD displays.

SUMMARY OF THE INVENTION

According to the invention, a symbol display element for a vehicle interior is proposed, which has a front cover formed by a diffusing lens. A shadow mask is arranged in the optical path between the diffusing lens and a plurality of point light sources that can be activated separately, and includes for each point light source an associated symbol that is projected in an enlarged manner onto the rear side of the diffusing lens upon activation of the corresponding point light source. With this easily realizable configuration of the display element, the different symbols share a common display surface on the diffusing lens which acts as a rear projection screen.

In the preferred embodiment of the display element, for an optimum presentation contrast of the different symbols, the optical paths of the individual point light sources up to the associated symbols on the shadow mask are optically screened from the optical paths of other point light sources, which can be achieved by means of simple screening plates integrally formed on the inside with the housing of the display element. The housing then preferably has the front cover on the end face, bears at its opposite end a printed circuit board onto which the point light sources are mounted, and supports between the front cover and the printed circuit board the shadow mask. The latter can be a continuous transparent plate onto which the symbols are printed, spayed or applied by heat-sealing embossing, or it is composed of individual transparent partial plates which are provided with customized symbols using appropriate techniques and are clipped into the housing.

BRIEF DESCRIPTION OF THE DRAWINGS

Further features and advantages of the invention will become apparent from the description below of a specific embodiment with reference to the accompanying drawings. The drawings show.

DESCRIPTION OF EXEMPLARY EMBODIMENT

Figure 1:
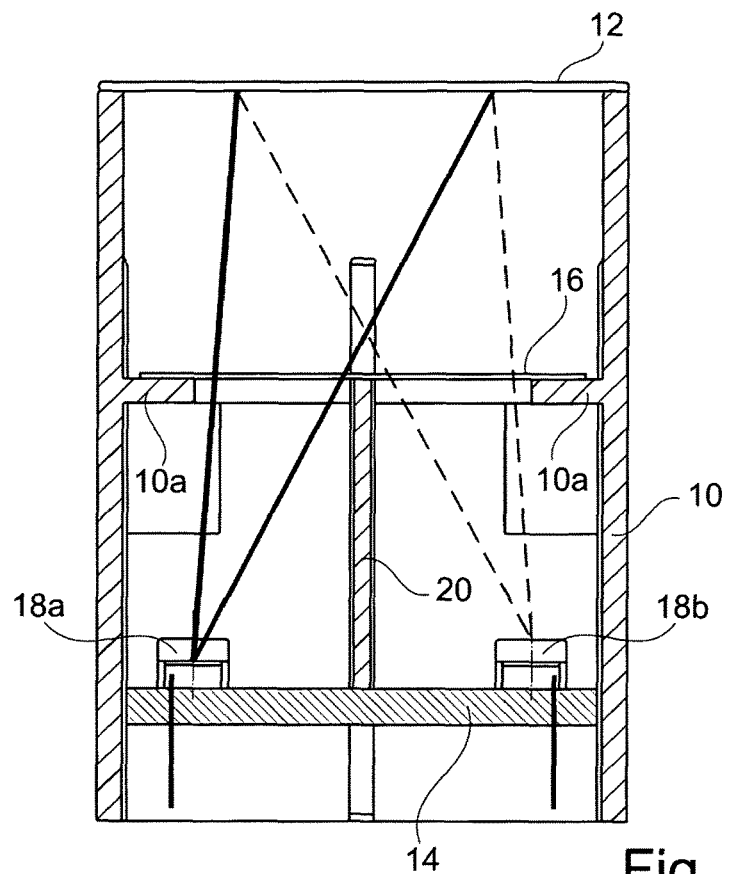
FIG. 1 a schematic sectional view of an embodiment of a symbol display element for a vehicle interior, and FIG. 2 a schematic perspective view to illustrate the mode of operation of the symbol display element.

A generally cuboidal housing 10 encloses a cavity which is closed on the end face by a front cover 12 formed by a diffusing lens. At the end facing away from the front cover 12, a printed circuit board 14 is inserted into the housing 10. The housing 10 forms on the inside along with integrally formed walls 10a a rest for a shadow mask 16 formed by an optically transparent plate having symbols applied thereon. In the embodiment shown, the printed circuit board is square and is equipped in each corner with a point light source 18a, 18b (FIG. 1) in the form of a light emitting diode. The space between the shadow mask 16 and the printed circuit board 14 is subdivided into chambers separated from each other in a light-proof manner by partition walls 20. The space between the shadow mask 16 and the front cover 12 is however free and permits rays originating from the point light sources 18a, 18b which pass through the shadow mask 16 to reach the rear side of the front cover without hindrance, which thus forms a rear projection screen. The point light sources 18a, 18b can be switched separately in a selective manner. FIG. 1 shows in solid lines a beam of light originating from the point light source 18a, which passes through an associated symbol zone on the shadow mask 16 and is projected onto the rear side of the front cover 12. A corresponding beam path is illustrated in dashed lines, which originates from the point light source 18b and passes through an associated symbol zone of the shadow mask 16 to be projected onto the same surface of the rear side of the front cover 12 alternatively illuminated by the point light source 18a.

Figure 2:
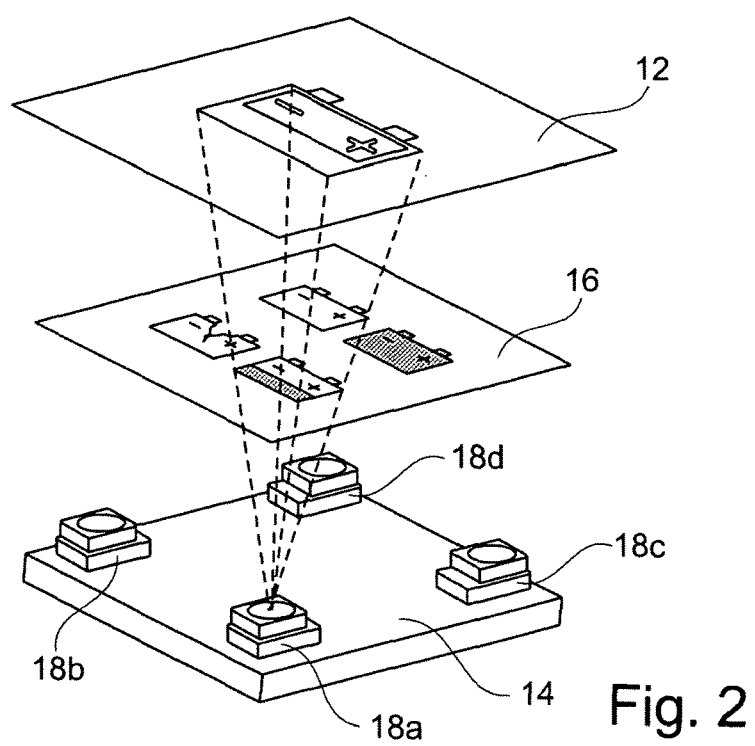

FIG. 2 illustrates the printed circuit board 14 as a square base plate in the four corners of which four point light sources 18a, 18b, 18c, 18d in the form of light emitting diodes or other luminescence elements are arranged. Merely the point light source 18a is represented in an activated state. The beam path originating therefrom passes through an associated symbol on the shadow mask 16 and is projected onto the rear side of the front cover 12. As the latter is a diffusing lens, the described arrangement acts as a rear projection device. The association of the four symbol zones arranged on the shadow mask 16 with the point light sources 18a to 18d is such that each of the four symbols is represented on the same projection surface of the front cover 12.

The symbols of the shadow mask 16 are applied onto the transparent plate as opaque surface elements, in particular by printing, heat-sealing embossing or spraying.

It must be understood that the configuration of the symbol display element shown in the figures is exemplary, in particular with regard to the number and the arrangement of the displayable symbols and the content of the symbols which are here designed to illustrate four different charge states of the vehicle battery.

The invention claimed is:

1. A symbol display element for a vehicle interior comprising a housing which has on the end face a front cover formed by a diffusing lens, and bears at its opposite end a printed circuit board on which a plurality of point light sources which can be activated separately in a selective manner is mounted, wherein the housing supports the shadow mask between the front cover and the printed circuit board and the shadow mask is arranged in the optical path between the diffusing lens and the point light sources and includes for each point light source an associated symbol which is projected in an enlarged manner onto the rear side of the diffusing lens upon activation of the corresponding point light source, wherein
   the space between the shadow mask and the front cover is free from optical elements and permits rays originating from the point light sources which pass through the shadow mask to reach the rear side of the front cover without hindrance
   the positions of the point lights sources and of the associated symbols on the shadow mask are chosen such that all symbols are substantially projected onto the same projection surface of the diffusing lens, and
   the space between the point light sources and the shadow mask is free from optical elements.

2. The symbol display element according to claim 1, wherein the optical paths of the individual point light sources up to the associated symbols on the shadow mask are optically screened from the optical paths of other point light sources.

3. The symbol display element according to claim 1, wherein the housing comprises screening walls which isolate the optical paths of the point light sources from each other up to the shadow mask.

4. The symbol display element according to claim 1, wherein the point light sources are formed by light emitting diodes.

5. The symbol display element according to claim 1, wherein the shadow mask is formed by an optically transparent plate onto which the symbols are applied by printing, heat-sealing embossing or spraying.

6. The symbol display element according to claim 1, wherein the shadow mask is composed of individual symbol supports which are each formed by an optically transparent plate onto which the symbol is applied.

7. The symbol display element according to claim 1, wherein the point light sources are arranged in the corners of a square.

8. The symbol display element according to claim 1, wherein the space between the shadow mask and the front cover is free from lenses.

9. A symbol display element for a vehicle interior comprising a housing which has on the end face a front cover formed by a diffusing lens, and bears at its opposite end a printed circuit board on which a plurality of point light sources which can be activated separately in a selective manner is mounted, wherein the housing supports the shadow mask between the front cover and the printed circuit board and the shadow mask is arranged in the optical path between the diffusing lens and the point light sources and includes for each point light source an associated symbol which is projected in an enlarged manner onto the rear side of the diffusing lens upon activation of the corresponding point light source, wherein the shadow mask is a single element, and wherein
   the space between the shadow mask and the front cover is free from optical elements and permits rays originating from the point light sources which pass through the shadow mask to reach the rear side of the front cover without hindrance,
   the space between the point light sources and the shadow mask is free from optical elements, and
   the positions of the point lights sources and of the associated symbols on the shadow mask are chosen such that all symbols are substantially projected onto the same projection surface of the diffusing lens.

10. A symbol display element for a vehicle interior comprising a housing which has on the end face a front cover formed by a diffusing lens, and bears at its opposite end a printed circuit board on which a plurality of point light sources which can be activated separately in a selective manner is mounted, wherein the housing supports the shadow mask between the front cover and the printed circuit board and the shadow mask is arranged in the optical path between the diffusing lens and the point light sources and includes for each point light source an associated symbol which is projected in an enlarged manner onto the rear side of the diffusing lens upon activation of the corresponding point light source, wherein
   the space between the shadow mask and the front cover is free from optical elements and permits rays originating from the point light sources which pass through the shadow mask to reach the rear side of the front cover without hindrance,
   the positions of the point lights sources and of the associated symbols on the shadow mask are chosen such that all symbols are substantially projected onto the same projection surface of the diffusing lens,
   the housing comprises screening walls which isolate the optical paths of the point light sources from each other up to the shadow mask, and
   the screening walls as well as walls integrally formed on the inside of the housing form a rest for the shadow mask.

* * * * *